United States Patent
Kanayama et al.

[11] Patent Number: 6,123,009
[45] Date of Patent: Sep. 26, 2000

[54] SWASH PLATE OF SWASH-PLATE COMPRESSOR

[75] Inventors: Hiroshi Kanayama; Shinya Kawakami; Chiaki Gouhara; Takayuki Kato; Masafumi Kato; Seiji Katayama; Masato Takamatsu, all of Aichi, Japan

[73] Assignees: Taiho Kogyo Co., Ltd., Toyota; Kabushiki Kaisha Toyoda Jidoshokki, Kariya, both of Japan

[21] Appl. No.: 09/104,172

[22] Filed: Jun. 25, 1998

[30] Foreign Application Priority Data

Jun. 26, 1997 [JP] Japan ................................. 9-170085

[51] Int. Cl.⁷ ......................................................... F01B 3/00
[52] U.S. Cl. .................................................. 92/71; 91/499
[58] Field of Search .................................... 92/71; 91/499

[56] References Cited

U.S. PATENT DOCUMENTS

| | | |
|---|---|---|
| 4,512,175 | 4/1985 | Kaku et al. . |
| 4,568,252 | 2/1986 | Hattori et al. . |
| 4,662,267 | 5/1987 | Kaku et al. ................................. 92/71 |
| 5,056,417 | 10/1991 | Kato et al. . |
| 5,655,432 | 8/1997 | Wilkosz et al. ............................. 92/71 |
| 5,875,702 | 3/1999 | Kawagoe et al. ........................ 92/12.2 |

FOREIGN PATENT DOCUMENTS 0 513 475 A2  2/1992  European Pat. Off. .

OTHER PUBLICATIONS

Patent Abstracts of Japan vol. 017, No. 392 (M–1450), Jul. 22, 1993 & JP 05 071528 A (Hitachi Ltd), Mar. 23, 1993.
Patent Abstracts of Japan vol. 096, No. 012, Dec. 26, 1996 & JP 08 199327 A (Taiho Kogyo Co Ltd; Toyota Autom Loom Works Ltd), Aug. 6, 1996.

*Primary Examiner*—Edward K. Look
*Assistant Examiner*—Thomas E. Lazo
*Attorney, Agent, or Firm*—Armstrong, Westerman, Hattori, McLeland & Naughton

[57] ABSTRACT

A swash plate of a swash-plate compressor is subjected to sliding on shoes and is required to have excellent seizure resistance and wear resistance under the dry lubricating condition. The swash plate according to the present invention is provided with the surface-treated layer, i,e., the intermediate layer consisting of Cu, Sn or metal phosphate, and a sliding contact layer consisting of $MoS_2$ and/or graphite and thermosetting resin.

18 Claims, 2 Drawing Sheets

SWASH PLATE OF SWASH-PLATE COMPRESSOR

BACKGROUND OF INVENTION

1. Field of Invention

The present invention relates to a swash plate of a swash-plate compressor, more particularly to surface-treatment technique for improving the sliding characteristics of the swash plate consisting of iron or aluminum-based material.

2. Description of Related Art

A swash-plate type compressor is shown, for example in U.S. Pat. No. 5,228,379 (c.f., FIG. 3). In a swash-plate type compressor, a swash plate 4 shown in FIG. 1 is rigidly secured obliquely to a rotary shaft (not shown) in such a manner that its slanting angle is variable. The swash plate 14 is engaged via the front shoes (not shown) and the rear shoes 19 with the piston (not shown). The descriptions of U.S. Pat. No. 5,228,379 (column 3, lines 16–48 are incorporated herein for describing the parts shown in FIG. 1.

The refrigerant gas is sucked from the suction chamber into the cylinder bores and is then compressed. The compressed refrigerant gas is discharged into the discharging chamber.

A noteworthy point in the sliding conditions of a swash-plate is that, during the initial operational period of a compressor, the refrigerant gas reaches the sliding part prior to the lubricating oil reaching the sliding part between the swash plate 14 and the shoes 19; thus the refrigerant gas has a rinsing effect on the lubricating oil which remains on the sliding part, with the result that the sliding condition is in a dry condition free of the lubricating oil. Seizure is, therefore, very likely to occur.

A number of the surface-treatment methods have, therefore, been proposed to adapt a swash plate to the sliding conditions as described above. The flame spraying of copper is recently proposed in domestic publication of PCT application WO95/25224 and Japanese Unexamined Patent Publication (kokai) No. 8-331,634.

Meanwhile, an academic paper entitled "Friction Wear Characteristics of Solid-Lubricant Coating in Coexistent Condition of Refrigerant and Lubrication Oil of Freezing Machine" was published in a solid-lubricant research meeting of Japanese Society for Tribology. According to this publication, the solid-lubricant coating, in which polyamide-imide is used as the binder, is tested under the conditions of non-lubrication and refrigerant gas. The solid-lubricant coating exhibits the best performance when $MoS_2$, $Sb_2O_3$ and graphite are added together. The solid-lubricant coating exhibits a slightly inferior performance, when only $MoS_2$ is added. The coating with only the binder and without the solid lubricant exhibits the worst performance. The substrate material, on which the solid-lubricant coating is applied, is chromated hyper-eutectic Al—Si alloy.

SUMMARY OF INVENTION

The most serious operating condition of a swash-plate type compressor is that of dry lubrication. The solid lubricant can maintain somewhat good seizure resistance under such operating condition. However, the coating, in which the solid lubricant is bonded with the thermosetting resin, is disadvantageously liable to wear off under such operating condition. This disadvantage apparently can be overcome by increasing the amount of thermosetting resin. There is, however, a limitation to the amount of increase of thermosetting resin, because degradation of the seizure resistance may result.

The present inventors conceived the idea of the use of a solid lubricant coating and to improve the structure of a substrate, in order to protect the swash plate from seizure. The present inventors carried out basic experiments in a laboratory and tests by an actual machine.

The present inventors then analyzed the results of the tests and experiments and made the following observations. In the swash-plate type compressor, the load applied from the shoes to the swash plate is high at a certain rotary angle of the swash plate. Under the other rotary angle, the load is relatively low. The swash plate is, therefore, subjected to reciprocating load during the rotation. In most cases, the seizure and wear of a swash plate occur on the region of the swash plate where the load applied is high. On the other region of a swash plate, where the load applied is low, the materials of the coating flow out from such region, with the result that the thickness of the coating is diminished. This thinning is not the removal or separation of the coating material from the substrate as occurs on the region where the load is high. The seizure and wear of the solid-lubricant coating, which occur on the high-load region, can be prevented by specifying the structure, such as the material and roughness of the substrate. The present invention is completed based on the analysis and observations as described above.

The swash plate according to the present invention comprises an aluminum- or iron-based substrate, an intermediate layer mainly composed of tin, copper or metallic phosphate, and a sliding contact layer which comprises thermosetting resin and at least one solid lubricant selected from molybdenum disulfide and graphite, and occasionally lead oxide.

The surface coating of a swash plate according to the present invention consists of the sliding contact layer and the intermediate layer. In the sliding contact layer, $MoS_2$ and/or graphite are used to attain good sliding performance under the dry lubricating condition. Since the solid lubricant greatly wears off in the initial operating period under the non-steady state, the underlying material is liable to be exposed. In this case, the sliding performance of the underlying material is poor. Seizure may readily occur. In order to eliminate this drawback, the intermediate layer is provided according to the present invention. It is expected that, when a part or all of the sliding contact layer wears off, since a certain amount of the lubricating oil is fed to the sliding surface, the intermediate layer does not necessarily require the excellent sliding properties such as proposed in the Japanese domestic patent publication of PCT application WO95/25224 and Japanese Unexamined Patent Publication 8-311,634, and may be tin-based alloy, copper (alloy) and metallic phosphate.

The swash plate according to the present invention is described hereinafter more in detail.

DESCRIPTION OF PREFERRED EMBODIMENTS

Figure 1:
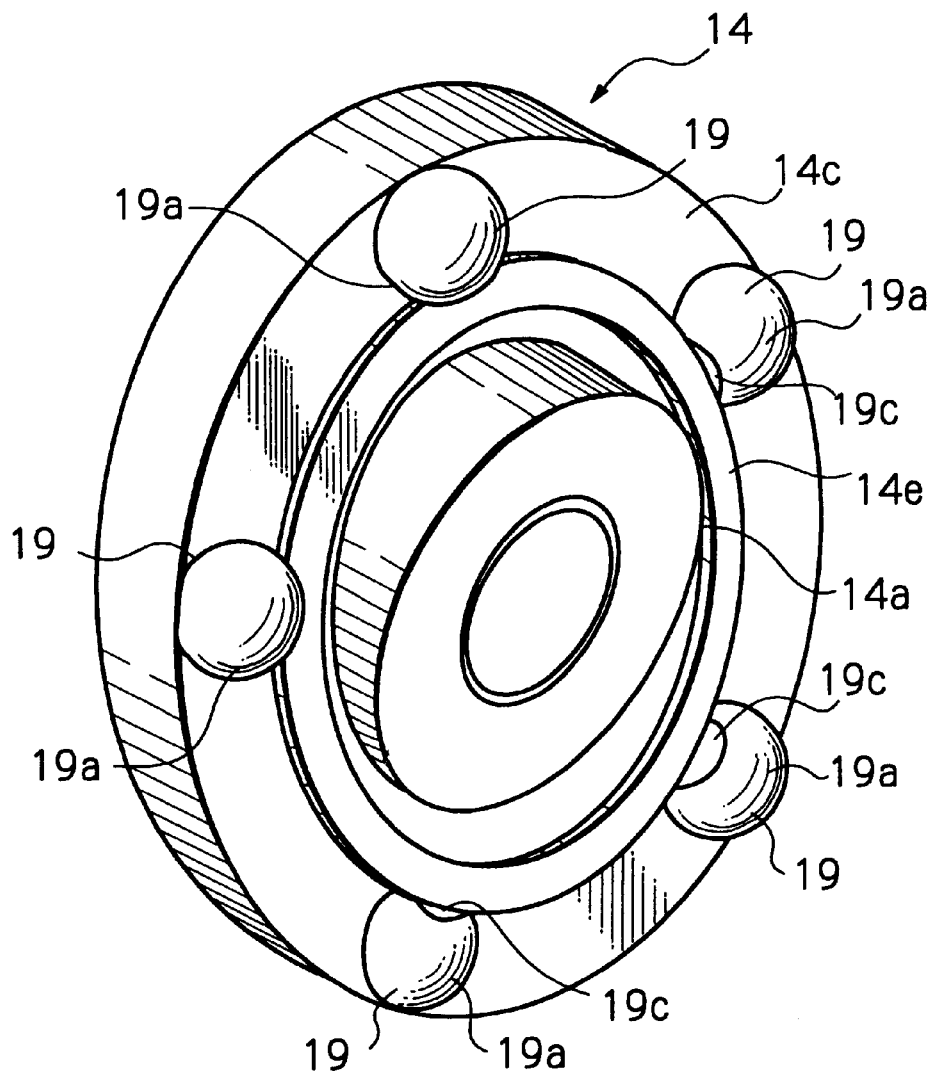
FIG. 1 is a perspective view showing the arrangement of a swash plate and shoes of a compressor.
Figure 2:
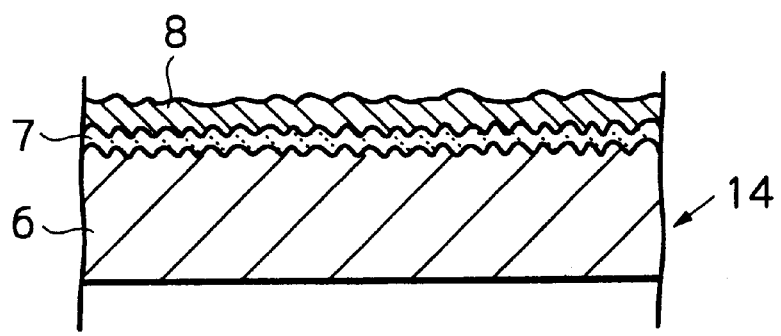
FIG. 2 shows a schematic cross sectional view of a swash plate according to the present invention.

The substrate 6 (FIG. 2) may be iron- or aluminum-based material. The aluminum-based material may be aluminum-clad material or aluminum-composite material. The aluminum based material is preferably an Al—Si alloy, with primary Si crystals, such as A390. The substrate 6 is preferably roughened, in such a manner that the intermediate layer 7 formed on the substrate 6 has also a rough surface. The purposes of surface roughening include improvements of adhesion of the sliding contact layer 8, the heat dissipating property of the intermediate and sliding contact layers, and the wear resistance of these layers. The roughness is preferably from Rz 0.4 to 25 μm, more preferably from Rz 0.6 to 20 μm. Under the lower limits of the roughness, the above mentioned purposes are hardly met. On the other hand, above the upper limits of the roughness, the sliding contact layer 8 must be unnecessarily thickly deposited to avoid the extremely rough surface of such layer.

The surface roughening can be carried out by means of shot blasting, etching and the like. The roughness formed by these methods is non-directional, that is, it has the identical value in any optional measuring direction.

Figure 3:
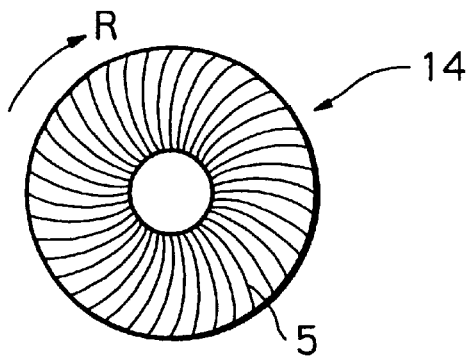
FIG. 3 illustrates a method for roughening the swash plate.

The roughness may be directional as shown in FIG. 3, in which the reference numeral 5 denotes the grooves. The grooves 5 can be formed by machining with, for example, a milling machine. Value of roughness shown in FIG. 3 greatly varies depending upon the measuring direction. The direction of roughness is defined herein to be coincident with the direction of grooves 5. The direction of roughness has preferably an angle of 5° or more with respect to the sliding direction (R). The direction of roughness intersecting the sliding direction (R) at an angle of 5° or more. Preferably, the surface area, where the direction of roughness intersects the sliding direction, amounts to 20% or more of the total surface of the swash plate 14. When the direction of roughness is aslant from the sliding direction as described above, the surface configuration of the intermediate and sliding contact layers copies the roughness of the swash plate 14.

When the solid lubricant is subjected to pressure from the shoes in the sliding direction, the solid lubricant is liable to separate from the swash plate. Such separation is suppressed by means of intersecting the roughness described above, because the solid lubricant is forced to press against the tapered surface of roughness.

The intermediate layer 7 (FIG. 2) is now described. The intermediate layer is provided between the substrate 6 and the sliding contact layer 8 and maintains good sliding characteristics even when the sliding contact layer 8 wears off. Preferable materials of the intermediate layer 7 are electrolytic or electroless tin plating, electrolytic tin-alloy plating, electrolytic or electroless copper plating, electrolytic plating of a copper alloy with alloying element(s) for improving the sliding characteristics, such as Pb, Sn, In and Ag, flame-sprayed copper (alloy), clad copper (alloy), and sintered copper (alloy). More preferable materials are electrolytic or electroless tin plating and flame-sprayed copper (alloy). The thickness of the intermediate layer is preferably from 1 to 1000 μm.

When the substrate 6, which is the underlying member of the intermediate layer 7, is made of steel or aluminum, it may be plated with nickel or copper so as to improve the adhesion between the substrate 6 and the intermediate layer 7. When the substrate 6 is made of aluminum, it may be chromated.

The sliding contact layer 8 is now described. The sliding contact layer comprises the thermosetting resin and at least one solid lubricant selected from the group consisting of molybdenum disulfide and graphite. The molybdenum disulfide ($MoS_2$) enhances the seizure resistance principally under the dry condition, while the graphite enhances the seizure and wear resistances principally under the oil-lubricating condition. The thermosetting resin is binder of the solid lubricant and ensures the coating strength and adhesion strength between the coating and the substrate. The thermosetting resin may be polyimide resin or polyamide imide resin.

Preferably, the thermosetting resin ranges from 20 to 80% by volume, while the solid lubricant ranges from 80 to 20% by volume of the sliding contact layer. More preferably, the thermosetting resin ranges from 30 to 70% by volume, while the solid lubricant ranges from 70 to 30% by volume of the sliding contact layer. Most preferably, the thermosetting resin ranges from 40 to 65% by volume, while the solid lubricant ranges from 60 to 35% by volume of the sliding contact layer.

The proportion of the solid lubricant is, preferably, from 10 to 90% by volume of $MoS_2$ and 90 to 10% by volume of graphite, more preferably from 20 to 80% by volume of $MoS_2$ and 80 to 20% by volume of graphite. Within these ranges the sliding characteristics under the dry condition and the oil-lubricating condition are well balanced.

$MoS_2$ has preferably average particle diameter of from 3 to 40 μm. Under the average particle diameter of less than 3 μm, the strength of the solid-lubricant coating and hence the wear resistance are lessened. On the other hand, over the average particle diameter of more than 40 μm, the surface of the solid-lubricant coating is rougher than the thickness of the oil film under the oil-lubricating condition, thereby degrading the sliding characteristics.

The graphite has preferably average particle diameter of from 0.3 to 10 μm. Under the average particle diameter of less than 0.3 μm, the graphite is liable to separate from the coating because of the too-fine particle diameter, with the result that the sliding characteristics may be degraded. On the other hand, over 10 μm of the average particle diameter, the sliding characteristics under the dry condition deteriorate and the adhesion of graphite particles in the solid-lubricant coating becomes unsatifactory.

The average particle diameter of $MoS_2$ and graphite can be measured by using a laser-diffraction type measuring device of particle diameter distribution (for example, available under the tradename of "HELOS" type tester, product of Nippon Electron Co., Ltd.)

Table 1 illustrates how the seizure resistance of the sliding contact layer is influenced by the average particle diameter of $MoS_2$ and graphite. The 10 μm thick sliding contact layer with varied average particle diameter of $MoS_2$ and graphite is formed on the substrate 6 used in Example 1. As is clear from Table 1, the seizure resistance is influenced by the average particle diameter of $MoS_2$ and graphite.

TABLE 1

| | Average Particle Diameter of $MoS_2$ (μm) | Average Particle Diameter of Graphite (μm) | Seizure Time (minutes) |
|---|---|---|---|
| 1 | 2 | 4 | 40 |
| 2 | 100 | 4 | 50 |
| 3 | 20 | 0.1 | 20 |
| 4 | 20 | 20 | 30 |
| 5 | 20 | 4 | more than 180 |

As is described hereinabove, during the relative rotary movement of the shoes and swash plate, the shoes are displaced from the low- to high-load regions and vice versa. The solid lubricant and thermosetting resin are transferred on the swash plate in such a manner that they deposit on a portion where the solid lubricant totally or partially wears out.

The solid-lubricant coating is subjected to the friction heat and force during the relative rotary movement of the swash plate and shoe. The sliding contact layer must resist against the shear stress due to the friction in order that such layer maintains its thickness. The substrate exerts an anchoring effect to retain the solid-lubricant layer against the friction force. In this regard, the sliding contact layer is preferably less than a certain thickness, because the anchoring effect is higher as the thickness of the sliding contact layer is thinner. However, when the thickness of the sliding contact layer is much less than a certain level, not only is the underlying intermediate layer readily exposed, but also the transfer of resin and the like from the low- to high- load regions is not expected. The thickness of the sliding contact layer is defined herein that the thickness is zero when the top surface of such layer is coincident with the apex of the average roughness of the intermediate layer. The zero micron thick sliding contact layer is satisfactorily resistant against the friction force, provided that the underlying intermediate layer is thoroughly rough. Specifically, when the roughness of a substrate is Rz 2 µm or more, the sliding contact layer is preferably from 0 to 25 µm thick. When the roughness of a substrate is less than Rz 2 µm, the sliding contact layer is preferably from 2 to 25 um. More preferably, the sliding layer is from 6 to 12 µm.

The roughness of the sliding contact layer is preferably less than a certain value, under which the above-mentioned resistant effect of such layer against the friction force is attained at a high level, and further the oil film can be easily formed. More specifically, the surface roughness of the sliding contact layer is preferably Rz 25 µm or less, more preferably Rz 12 µm or less. Under severe conditions, where sliding speed and load are high, the surface roughness of the sliding contact layer is preferably Rz 6 µm or less.

The sliding contact layer may additionally contain at least one hard additive for improving the wear resistance, selected from the group consisting of $Sb_2O_3$, $SnO_2$, clay and $Al_2O_3$. The content of hard additive(s) is preferably 10% by volume or less, more preferably from 1 to 10% by volume, most preferably from 3 to 8% by volume. The average particle diameter of the hard additives is preferably from 1 to 5 µm.

Now, preferable methods for depositing and forming the sliding contact layer are described.

The components of the sliding contact layer, that is, the thermosetting resin and solid lubricant, and occasionally hard additives, are mixed with a resin solvent, if necessary, so as to adjust the viscosity. The so-prepared coating component is then subjected to any one of the following processes for formation of the coating.

(1) Spray coating method, such as air-spraying and air electro-static coating
(2) Bell-type rotary spraying electro-static coating
(3) Screen printing
(4) Pad printing
(5) Roll die method to squeeze the coating component on the substrate.
(6) Dipping or tumbling method Viscosity of the mixture is desirably 300 centipoise or less for the methods (1) and (2), in a range of from 800 to 50000 centipoise for the methods (3)–(5), and in a range of from 30 to 200 centipoise for the method (6).

The solid-lubricant coating formed by the methods (1)–(6) is baked at a temperature of 170° C. or higher, preferably 190° C. or higher. After baking, the surface of coating is polished by a diamond or SiC grinding wheel or is lapped by steel wool, or various fibers.

The present invention is hereinafter described with reference to the Examples.

EXAMPLES

Five kinds of substrate with or without the intermediate layer were prepared and used in the examples and comparative examples.

(1) Aluminum alloy (A390)—lapping finished
Surface roughness—Rz 0.512 µm
(2) Aluminum alloy (A390)—Sn plating (intermediate layer)
Thickness of plating—3 µm
Surface roughness of substrate—Rz 0.84 µm
(3) Carbon steel (S15C)—Cu flame spraying (intermediate layer)
Thickness of flame spraying—50 um (pure copper)
Surface roughness of substrate—Rz 0.5–1.6 µm
(4) Carbon steel (S15C)—Cu flame spraying (intermediate layer) followed by shot blasting
Thickness of flame spraying—50 µm (pure copper)
Surface roughness of substrate—Rz 2–15 µm
(5) Carbon steel (S15C)—carburization (intermediate layer)
Surface roughness of substrate—Rz 2–15 µm

Example 1

The starting materials, 50% by volume of commercially available polyamide imide resin, 30% by volume of $MoS_2$ (20 µm of average particle diameter), 20% by volume of graphite (1 µm of average particle diameter), were prepared. As solvent of the resin, N-methyl-2-pyrolidone was added to the starting materials and the whole components were mixed, followed by depositing on the substrate (2) by spray coating. Baking was then carried out at 190° C. for 1 hour in ambient air. Subsequently, the surface of the solid-lubricant coating was finished by grinding with a SiC grinding wheel. The resultant sliding contact layer was 10 µm thick and had a surface roughness of 5 µm Rz. The test specimens of a seizure test, which consisted of the substrate (2) and the sliding contact layer, were tested under the following conditions.

Tester: three-pin/disc type seizure tester
Load: 1 kN
Rotation number: 1000 rpm
Sliding condition: refrigerant gas (non-chlorine type HFC-134a)
Size of specimen: 96 mm of outer diameter, and 75 mm of inner diameter
Opposite material: bearing steel (SUJ2) 14.28 mm in size, surface roughness—0.4 µm Rz.
Temperature: test was started at room temperature. Subsequent temperature rise is neither measured nor controlled.

The result of the test is shown in the Table together with the other examples and comparative examples.

Example 2

The same method as in Example 1 was carried out except that the substrate (4) was used instead of the substrate (2).

Example 3

The same method as in Example 1 was carried out except that 50% by volume of polyamide imide resin, 30% by volume of MoS$_2$, 15% by volume of graphite and 5% by volume of PbO (the average particle diameter—2 μm) were used as the materials of the sliding contact layer.

Comparative Example 1

The same method as in Example 1 was carried out except that the substrate (1) was used instead of the substrate (2).

Comparative Example 2

The same method as in Example 1 was carried out except that the substrate (2) was used as the specimen.

Comparative Example 3

The same method as in Example 1 was carried out except that the substrate (3) was used instead of the substrate (2), and, further, no sliding contact layer was used.

Comparative Example 4

The same method as in Example 1 was carried out except that the substrate (5) was used instead of the substrate (2).

TABLE 2

| Examples<br>Comparative<br>Examples | Seizure<br>Time<br>(minutes) |
| --- | --- |
| Example 1 | more than 180 |
| Example 2 | more than 180 |
| Example 3 | more than 180 |
| Comparative Example 1 | 3 |
| Comparative Example 2 | 10 |
| Comparative Example 3 | 10 |
| Comparative Example 4 | 10 |

Example 4

The swash plate (96 mm in diameter) was treated by the method of Example 1 to form the intermediate layer and the sliding contact layer, thickness of which was 5 um. The so treated swash plate was mounted in a swash-plate type compressor and was subjected to the seizure test under the conditions of: 10000 rpm of rotation speed, dry lubrication and refrigerant gas. The seizure test was repeated four times.

Figure 4:
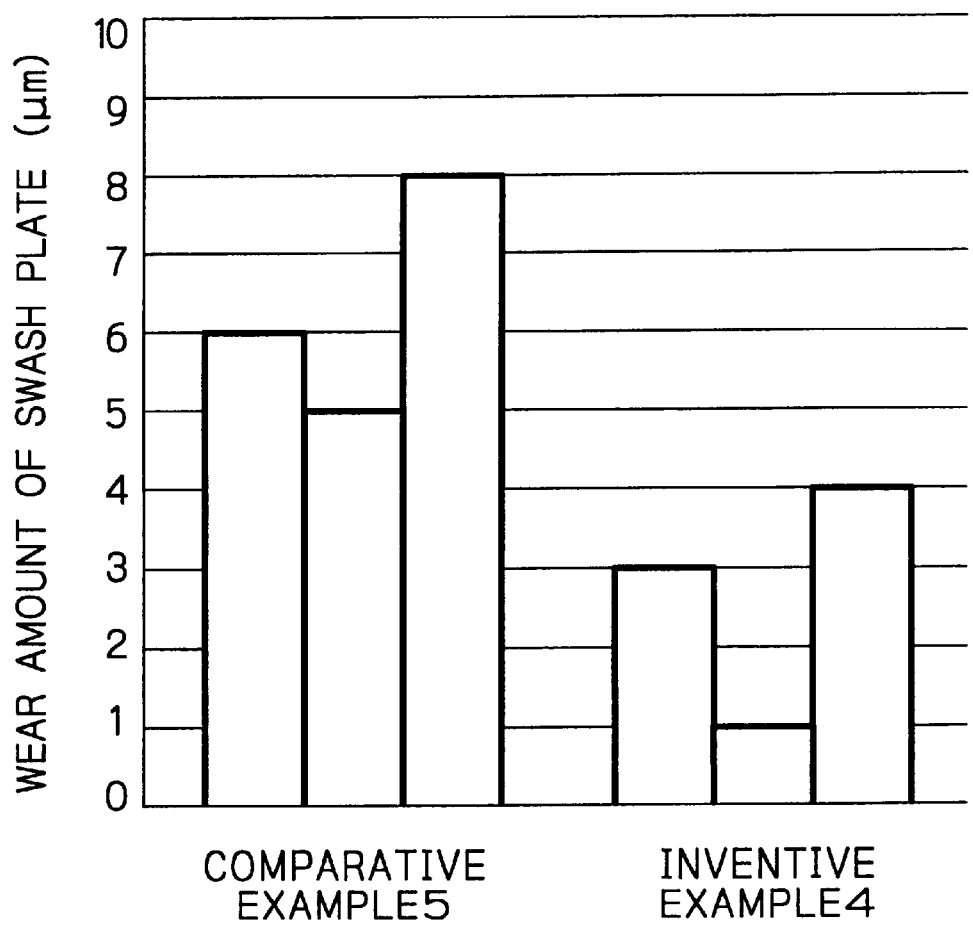
FIG. 4 is a graph showing the results of wear test in an actual machine.

The swash plate was also subjected to the wear test for 100 hours under the conditions of: repeated cycles of 700 rpm of rotation speed for 20 seconds and then stopped for 5 seconds. The maximum and minimum values obtained in the four seizure tests are shown in Table 3. The result of the wear test is shown in FIG. 4.

Example 5

The swash plate was treated by the method of Example 2 to form the intermediate layer and the sliding contact layer, thickness of which was 5 um. The so-treated swash plate was subjected to the same tests as in Example 4. The results are shown in Table 3 and FIG. 3 as for Example 4.

Comparative Example 5

The substrate without the sliding contact layer was subjected to the same tests as in Example 4. The results are shown in Table 3 and FIG. 4 as for Example 2.

TABLE 3

| Examples<br>Comparative<br>Examples | Seizure<br>Time<br>(seconds) |
| --- | --- |
| Example 4 | 60–90 |
| Example 5 | 60–90 |
| Comparative Example 5 | 18–20 |

As is described hereinabove, and is clear from the laboratory experiments and experiments in an actual machine, the swash-plate treated by the surface treatment method according to the present invention exhibits improved seizure and wear resistances under the dry condition.

What is claimed is:

1. A swash plate of a swash-plate type compressor, which comprises:

a substrate consisting of a material selected from the group consisting of aluminum-based material and iron-based material;

an intermediate layer which comprises at least one element selected from the group consisting of tin, copper and metallic phosphate; and, a sliding contact layer which comprises thermosetting resin and at least one solid lubricant selected from the group consisting of molybdenum disulfide, graphite and lead oxide.

2. A swash plate according to claim 1, wherein said solid lubricant is at least one selected from the group consisting of molybdenum disulfide and graphite.

3. A swash plate according to claim 1, or 2, wherein said sliding contact layer consists of from 20 to 80% by volume of thermosetting resin and from 80 to 20% of the solid lubricant.

4. A swash plate according to claim 1, or 2, wherein said sliding contact layer further comprises at least one hard additive selected from the group consisting of Sb$_2$O$_3$, SnO$_2$, Al$_2$O$_3$ and clay.

5. A swash plate according to claim 1, or 2, wherein said sliding contact layer further comprises not more than 10% by volume of the hard additive.

6. A swash plate according to claim 2, wherein said molybdenum disulfide has an average particle diameter of 3 to 40 um, and said graphite has an average particle diameter of from 0.3 to 10 μm.

7. A swash plate according to claim 6, wherein said molybdenum disulfide is from 90 to 10% by volume, and said graphite is from 10 to 90% by volume.

8. A swash plate according to claim 1, or 2, wherein said substrate and said intermediate layer has non-oriented roughness, the value of which is invariable depending upon the measuring direction.

9. A swash plate according to claim 8, wherein the roughness is from Rz 0.4 to 25 μm.

10. A swash plate according to claim 1, or 2, wherein said substrate and said intermediate layer have oriented roughness consisting of grooves, direction of which intersects with a sliding direction of the swash plate.

11. A swash plate according to claim 10, wherein the intersecting angle between the roughness and the sliding direction (R) is 5° or more.

12. A swash plate according to claim 11, wherein the roughness is from Rz 0.4 to 25 µm.

13. A swash plate according to claim 12, wherein said sliding contact layer consists of from 20 to 80% by volume of thermosetting resin and from 80 to 20% of the solid lubricant.

14. A swash plate according to claim 13, wherein said molybdenum disulfide has an average particle diameter of 3 to 40 um, and said graphite has an average particle diameter of from 0.3 to 10 µm.

15. A swash plate according to claim 14, wherein said molybdenum disulfide is from 90 to 10% by volume, and said graphite is from 10 to 90% by volume.

16. A swash plate according to claim 12, wherein said sliding contact layer further comprises at least one hard additive selected from the group consisting of $Sb_2O_3$, $SnO_2$, $Al_2O_3$ and clay.

17. A swash plate according to claim 12, wherein said sliding contact layer further comprises not more than 10% by volume of the hard additive.

18. A swash plate according to claim 11, wherein the oriented roughness with the intersecting angle of 5° or more is formed on at least 20% by area of the swash plate.

* * * * *